(12) United States Patent
  Leikas (10) Patent No.: US 11,443,418 B2
(45) Date of Patent: Sep. 13, 2022

(54) MACHINE VISION SYSTEM WITH A COMPUTER GENERATED VIRTUAL REFERENCE OBJECT

(71) Applicant: OY MAPVISION LTD, Helsinki (FI)

(72) Inventor: Esa Leikas, Espoo (FI)

(73) Assignee: OY MAPVISION LTD, Helsinki (FI)

( * ) Notice: Subject to any disclaimer, the term of this patent is extended or adjusted under 35 U.S.C. 154(b) by 150 days.

(21) Appl. No.: 16/772,914

(22) PCT Filed: Dec. 14, 2018

(86) PCT No.: PCT/FI2018/050915
§ 371 (c)(1),
(2) Date: Jun. 15, 2020

(87) PCT Pub. No.: WO2019/115881
PCT Pub. Date: Jun. 20, 2019

(65) Prior Publication Data
US 2020/0311909 A1    Oct. 1, 2020

(30) Foreign Application Priority Data

Dec. 15, 2017   (FI) ..................................... 20176126

(51) Int. Cl.
  *G06K 9/00*   (2022.01)
  *G06T 7/00*   (2017.01)
(52) U.S. Cl.
  CPC ............ *G06T 7/0006* (2013.01); *G06T 7/001* (2013.01); *G06T 7/97* (2017.01); *G06T 2207/10012* (2013.01)
(58) Field of Classification Search
  CPC ......... G06T 7/0006; G06T 7/001; G06T 7/97; G06T 2207/10012; G06T 7/60;
(Continued)

(56) References Cited

U.S. PATENT DOCUMENTS 5,488,479 A   1/1996  Williams et al.
6,173,070 B1  1/2001  Michael et al.
(Continued)

FOREIGN PATENT DOCUMENTS

CN      1957373 A    5/2007
CN    102414640 A    4/2012
(Continued)

OTHER PUBLICATIONS

Search Report for Finnish Application No. 20176126 dated May 4, 2018 (2 pages).
(Continued)

*Primary Examiner* — Dhaval V Patel
(74) *Attorney, Agent, or Firm* — Alston & Bird LLP (57) ABSTRACT

A machine vision system using a computer generated virtual reference object is disclosed. When the exact measures of the virtual reference object are known the machine vision system is capable of measuring differences on an absolute scale. In the machine vision system, a virtual reference object is produced based on computer drawings. The computer generated virtual reference object is further processed in order to achieve high photorealistic accuracy. The processing may involve combining portions from image of a manufactured object or computationally producing an image that looks like measured object. When the computer generated virtual reference object is based on the model drawing it does not include inaccuracies caused by manufacturing tolerances.

9 Claims, 4 Drawing Sheets

(58) Field of Classification Search
CPC ....... G01B 11/24; G01B 11/00; G01C 11/025; G01C 11/06; G01N 21/8851
See application file for complete search history.

(56) References Cited

U.S. PATENT DOCUMENTS

| | | | |
|---|---|---|---|
| 9,767,611 B2* | 9/2017 | Takemoto | G06T 19/006 |
| 2009/0096790 A1 | 4/2009 | Wiedemann et al. | |
| 2012/0194665 A1* | 8/2012 | Kilian | H04N 13/257 348/86 |
| 2013/0182903 A1 | 7/2013 | Nammoto et al. | |
| 2015/0139535 A1* | 5/2015 | Siddiqui | G06K 9/6255 382/154 |
| 2015/0146964 A1 | 5/2015 | Tai et al. | |
| 2016/0189358 A1 | 6/2016 | Boufarguine | |
| 2020/0005527 A1* | 1/2020 | Robert | G06T 7/514 |

FOREIGN PATENT DOCUMENTS

| | | |
|---|---|---|
| CN | 103793936 A | 5/2014 |
| CN | 104094082 A | 10/2014 |
| CN | 105180817 A | 12/2015 |
| CN | 106127758 A | 11/2016 |
| CN | 106352790 A | 1/2017 |
| CN | 107452051 A | 12/2017 |
| EP | 1574818 A2 | 9/2005 |
| JP | 2014020969 A | 2/2014 |
| TW | 201520540 A | 6/2015 |
| WO | WO 98/22860 A2 | 5/1998 |

OTHER PUBLICATIONS

International Preliminary Report on Patentability for PCT/FI2018/050915 dated Mar. 3, 2020 (13 pages).
International Search Report for PCT/FI2018/050915 dated Mar. 26, 2009 (4 pages).
1st Office Action for China Application No. 2018800810397 dated Apr. 23, 2021 (7 pages).
Search Report for China Application No. 2018800810397 dated Apr. 15, 2021 (3 pages).

* cited by examiner

Figure 4

MACHINE VISION SYSTEM WITH A COMPUTER GENERATED VIRTUAL REFERENCE OBJECT

CROSS-REFERENCE TO RELATED APPLICATIONS

This application is a national phase entry of International Application No. PCT/FI2018/050915, filed Dec. 14, 2018, which claims priority to Finnish Application No. 20176126, filed on Dec. 15, 2017, the entire contents of which are incorporated herein by reference.

DESCRIPTION OF BACKGROUND

The following disclosure relates to machine vision systems. Particularly, the disclosure relates to measuring machine vision systems that are used in quality control or in other similar tasks that require measuring an object. More particularly the disclosure relates to a machine vision system using a reference object. Computer controlled machine vision systems are used in various applications. One typical application is quality control of manufactured objects in manufacturing industry. It is possible to measure various properties of an object by imaging the manufactured object using one or more cameras. The measurement may involve measuring a whole object or some selected features of the object. Thus, the measurement may be one-, two- or three-dimensional, or may even be performed in a combination of dimensions, depending on the selected features. In addition to the size and shape, it is also possible to measure other characteristics, such as color, roughness or other such features. The measurements of a machine vision system are typically made by comparing the manufactured object with a model object. The results achieved typically give a relative difference of the measured object and the model object used.

To measure a three-dimensional coordinate, only two cameras are required, as a three-dimensional coordinate can be computed from two two-dimensional images, provided that the measured point is visible in both images. However, typically the number of cameras is larger. This is because a larger number of cameras increases the coverage and accuracy of the measurement. The cameras are typically located so that they can see all features of the measured object, or at least as many of the features as possible. Correspondingly, it is common that a measured feature is not seen by all of the cameras. In addition to increasing the number of cameras, a plurality of other concepts, such as precise calibration and image processing algorithms, are known to improve the measurement accuracy. Furthermore, it is possible to plan the camera locations for particular objects or use more accurate cameras or specific lighting to improve the quality of images acquired from desired features.

Measuring machine vision systems are particularly good in that they recognize measured features similarly under different conditions. Thus, when an object is measured, features such as edges and holes will be detected similarly, even if the conditions change. Because of this, it is possible to accurately measure even small changes in the location or the shape of the object. Although the measurement results derived from the acquired images are precise, they cannot be compared with measurement results measured with other measurement tools, such as a coordinate measurement machine. This is because it is difficult to measure, for example, the absolute location of an edge by using conventional machine vision systems and methods. Although it is possible to accurately measure the relative change of size, location or other changes of the measured object, it is difficult to measure the same change on an absolute scale instead of the relative difference.

In conventional solutions, these measurements are sometimes supplemented by accurately measuring the location of the measured object or by placing the measured object in a measurement jig so that the accurate location is known. When the location is exactly known, it is possible to measure at least some of the absolute measures of the object to be measured. One method is to make a reference object ("golden object") that is manufactured as accurately as possible to meet the nominal dimensions of the object. Another way is to measure a reference part accurately with an absolute reference measuring system and add measured differences to the reference part values, thus getting results comparable to the absolute scale.

These approaches, however, may be problematic if there is a need for measuring different types of objects or a large number of objects. The measurements will be slow if the measured object needs to be accurately positioned before the measurement can be done. Correspondingly, if there is a need to measure different types of objects, there may also be a need for different types of jigs or other positioning means that may need to be changed between the measurements. All these mechanical methods are expensive and subject to wear and tear. Even if the use of mechanical jigs was avoided by suitable mathematical or optical positioning methods, there would still be a need for an absolute reference measuring system that is inexpensive to purchase and use.

SUMMARY

A machine vision system using a computer generated virtual reference object is disclosed. When the exact measures of the virtual reference object are known, the machine vision system is capable of measuring differences on an absolute scale. In the machine vision system, a virtual reference object is produced based on computer drawings. The computer generated virtual reference object is further processed in order to achieve high photorealistic accuracy. The processing may involve combining portions from an image of a manufactured real object or computationally producing an image that looks like a real measured object. When the computer generated virtual reference object is based on a model drawing, it does not include inaccuracies caused by manufacturing tolerances but includes all features and characteristics of the object as they were designed.

In an aspect a method for measuring an object is disclosed. The method comprises receiving a three-dimensional computer generated virtual reference object, wherein the received virtual reference object is generated based on a model drawing of the object and the virtual reference object comprises exact coordinates of the object, wherein the exact coordinates comprise coordinates of at least one discrete point; acquiring at least two images of the object, wherein the acquired at least two images are acquired with at least two different viewing sensors; determining a three-dimensional location of at least one discrete point on the object based on the acquired images, wherein the determined three-dimensional location is in the same coordinate system with the three-dimensional computer generated virtual reference object; determining the corresponding discrete point coordinates on the virtual reference object; and based on the determined location of at least one discrete point on the acquired images and corresponding exact coordinates on the virtual reference object, computing the absolute scale location of at least one discrete point on the object.

The method as described above facilitates measuring objects in absolute scale without having an exact manufactured reference object. The method described above removes all problems relating to wearing of the reference object. It further helps removing the inaccuracies caused by measurement tolerances. These provide improved measurement quality with reduced cost.

In an embodiment the method further comprises generating the computer generated virtual reference object based on the model drawing of the object. In an embodiment the generating further comprises receiving additional information comprising at least one of the following: lighting setting information, object material information, object color information or viewing sensor parameters. The viewing sensor parameters comprise camera coordinates and orientation. In another embodiment the generating further comprises acquiring at least one image of a manufactured object; generating a projection view based on a model drawing, wherein the projection view corresponds with the direction of acquiring at least one image of the manufactured object; and aligning at least a portion of at least one acquired image on the generated projection view.

In another embodiment the generating further comprises producing a photorealistic image of the object based on the model drawing and received additional information.

In an embodiment the method described above is implemented as a computer program comprising computer program code configured to perform a method as described above when the computer program is executed in a computing device.

In an embodiment a controller comprising at least one processor and at least one memory is disclosed. The at least one processor is configured to perform a method as described above. In a further embodiment a machine vision system is disclosed. The machine vision system comprises a housing; a camera system comprising a plurality of cameras inside the housing; a lighting system comprising a plurality of lighting devices inside the housing; and a controller as described above, wherein the controller is connected to the machine vision system and configured to perform a method as described above.

Using a computer generated virtual reference object provides several benefits. The computer generation may be performed without involving manufacturing tolerances. Thus, the computer generated virtual reference object matches exactly with the plans of the object. This is achieved without manufacturing a costly reference object and accurately measuring the manufactured reference object. Thus, the use of a computer generated virtual reference object increases the accuracy of measurements.

A further benefit of using the computer generated virtual reference object is that when the exact measures on an absolute scale are known, the differences observed in the measurements can be easily computed on an absolute scale. A further benefit of this is that when the reference object does not need to be measured, also the inaccuracies caused by the measurement tolerances can be avoided.

Conventional real reference objects are also prone to mechanical wearing and other problems that are caused by exposure to the manufacturing site environment. For example, a person performing the measurements may drop the reference object which may result in scratches and other mechanical defects. Furthermore, sometimes dirt and other impurities may cause the object look different. It is possible that in some cases, even exposure to sunlight may be a source of visible changes in the reference object. All these exposure related defects may be avoided by using a computer generated virtual reference object.

BRIEF DESCRIPTION OF THE DRAWINGS

The accompanying drawings, which are included to provide a further understanding of the machine vision system and constitute a part of this specification, illustrate embodiments and together with the description help to explain the principles of the machine vision system. In the drawings.

DETAILED DESCRIPTION

Reference will now be made in detail to the embodiments, examples of which are illustrated in the accompanying drawings.

In the following, first measurements involving a computer generated virtual reference object will be discussed. Then, two optional methods for preparing the computer generated virtual reference object will be discussed. The computer generated virtual reference object should be understood as one or more reference images, which are also called reference views, that are computer generated views of the virtual reference object. Thus, the computer generated virtual reference object should not be understood as one reference view but as a set comprising one or more reference views that show the object from various angles and possibly with different parameters. Furthermore, the computer generated reference model may also have several reference views from the same angle with different lighting or other settings. Furthermore, a person skilled in the art understands that the computer generated virtual reference object need not be a complete object. It is sufficient if the features to be measured are covered (areas of interest).

In the following description a machine vision system involving a plurality of cameras is discussed. However, the expression camera is used only for providing an understanding, as a conventional digital camera is typically suitable for the purpose. Instead of a conventional camera, also other types of viewing sensors that are able to produce an image that is suitable for comparison may be used. These include different types of special purpose cameras, for example a heat camera, scanner devices, digital x-ray imaging apparatuses, bendable imaging units, three-dimensional cameras and the like.

Figure 1:
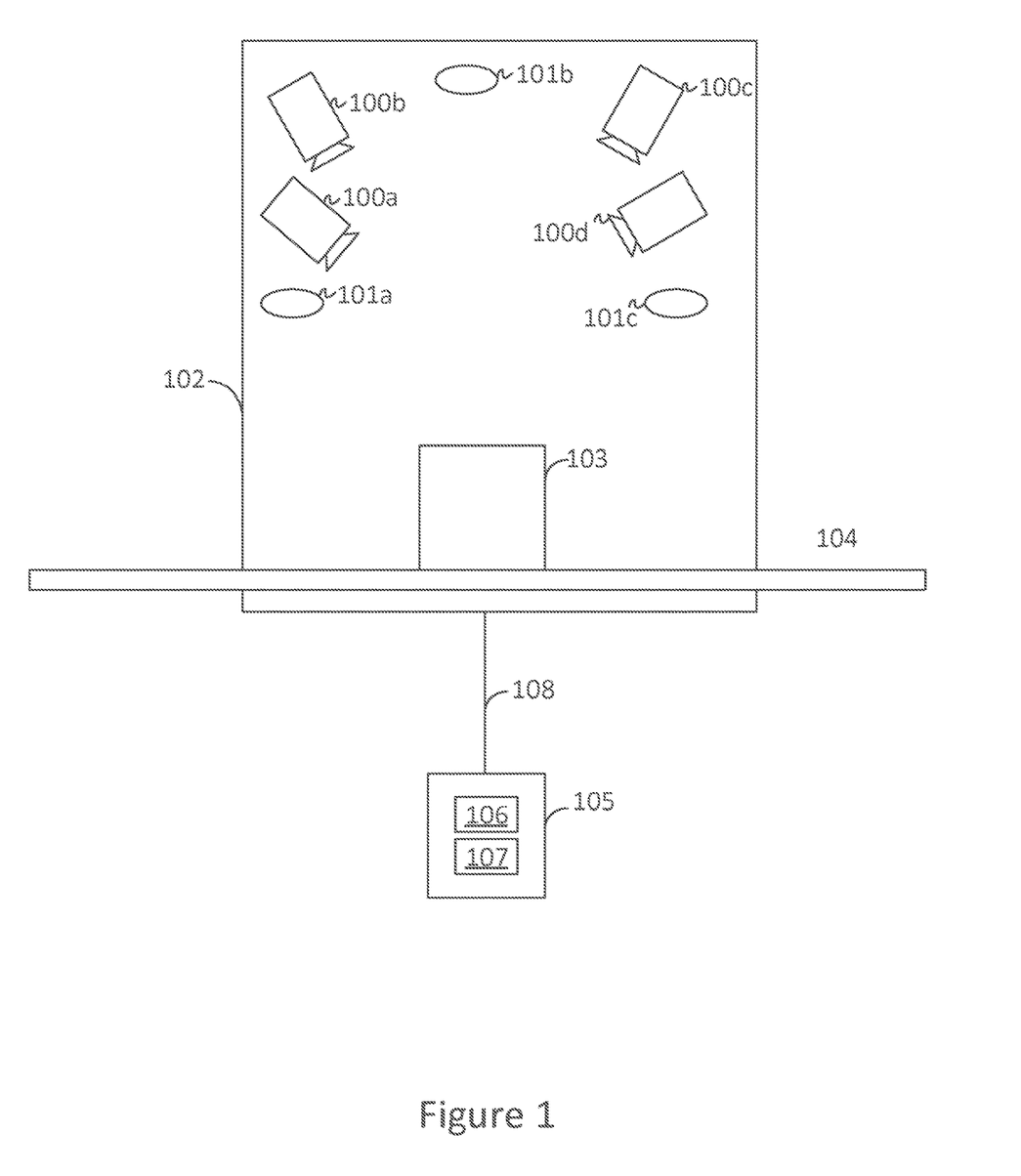
FIG. 1 is an example of a machine vision system.

In FIG. 1, a block diagram illustrating an example of a machine vision system is disclosed. In FIG. 1 a measurement station 102 is disclosed. The measurement station 102 includes four cameras 100a-100d and three lighting devices 101a-101c. The number of cameras and lighting devices is not limited to four and three but can be chosen freely. Typically, the number of cameras and lighting devices is higher. Cameras and lighting devices may be attached to one or more frames that are further attached to the measurement station 102. Instead of frames, the cameras and lighting devices may also be directly attached to the walls of the measurement station 102. The cameras and if needed, also the lighting devices, are calibrated using conventional calibration methods to a selected coordinate system.

The measurement station 102 further includes a conveyor 104 that is used to bring an object 103 to be measured inside the measurement station. The conveyor is just an example; the measured object may also be brought by using other means, such as an industrial robot, or it can be placed by a person performing measurements.

In this description the ambient light is assumed to be the lighting conditions of the hall or premises where the measurement station is located. Ambient light may be natural light from windows or lighting devices in the premises. It is beneficial that the measurement station 102 can be closed such that ambient light does not disturb the measurements, however, this is not always necessary. For example, if the measurement benefits from the exactly defined lighting arrangement the ambient light may be compensated. Using a powerful lighting arrangement it is possible to use the measurement station 102 even if some leaking ambient light may cause some variation in the measurement conditions. The closure of the measurement station 102 can be provided, for example, by using doors or curtains at conveyor openings if a conveyor is used. If the measured object is placed to a measurement platform by a person it is easy to manufacture tight measurement station where the ambient light is completely removed. If the ambient light cannot be completely removed additional lighting devices that are used for compensating the ambient light may be used.

The measurement station 102 is connected to a controller 105 by using a network connection 108. The network connection may be wired or wireless. The controller may be arranged at the measurement station or it can be in a remote location. If the controller 105 is located at the measurement station 102 it can be operated remotely, for example, from a control room for controlling several systems of the manufacturing site. The controller 105 comprises at least one processor 106 and at least one memory 107. The processor is configured to execute computer program code in order to perform measurements. The at least one memory 107 is configured to store computer program code and the related data, for example, the acquired measurement images and reference views. The controller 105 is typically connected to further computing devices, for example, for possible long term storage of the measurement images and measurement conditions.

Figure 2:
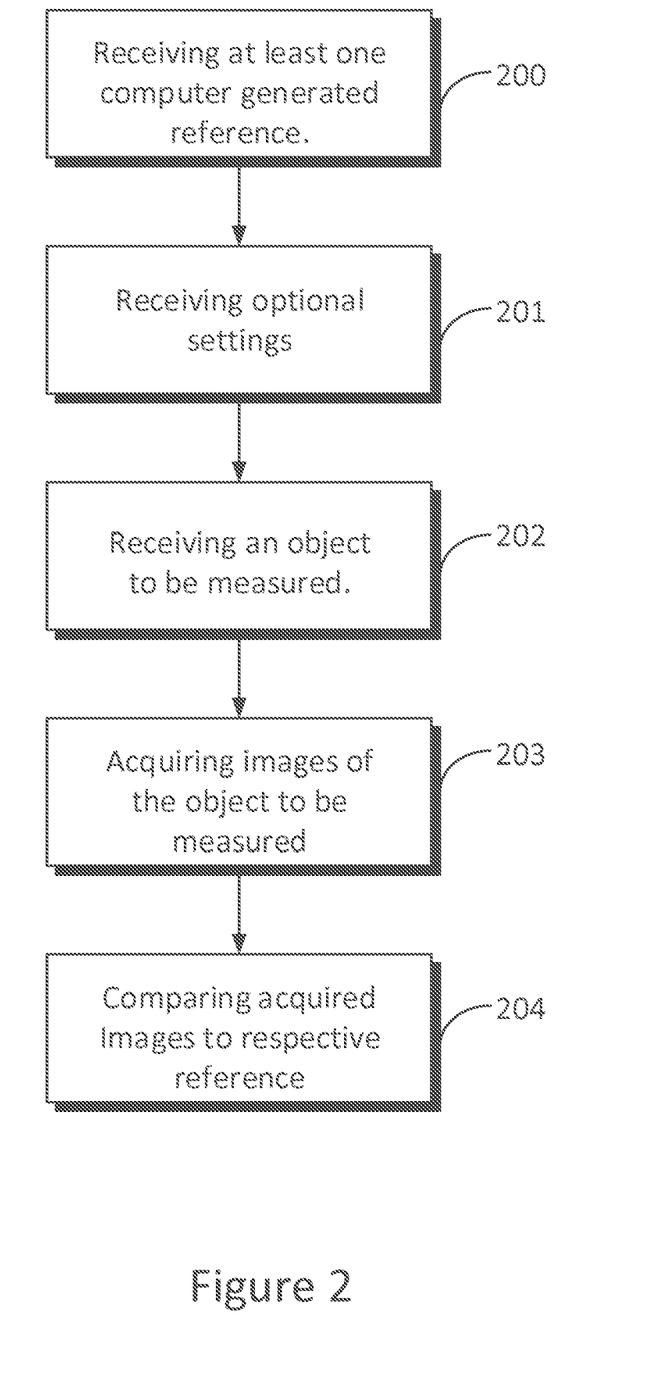
FIG. 2 is an example of a method of a machine vision system.
Figure 3:
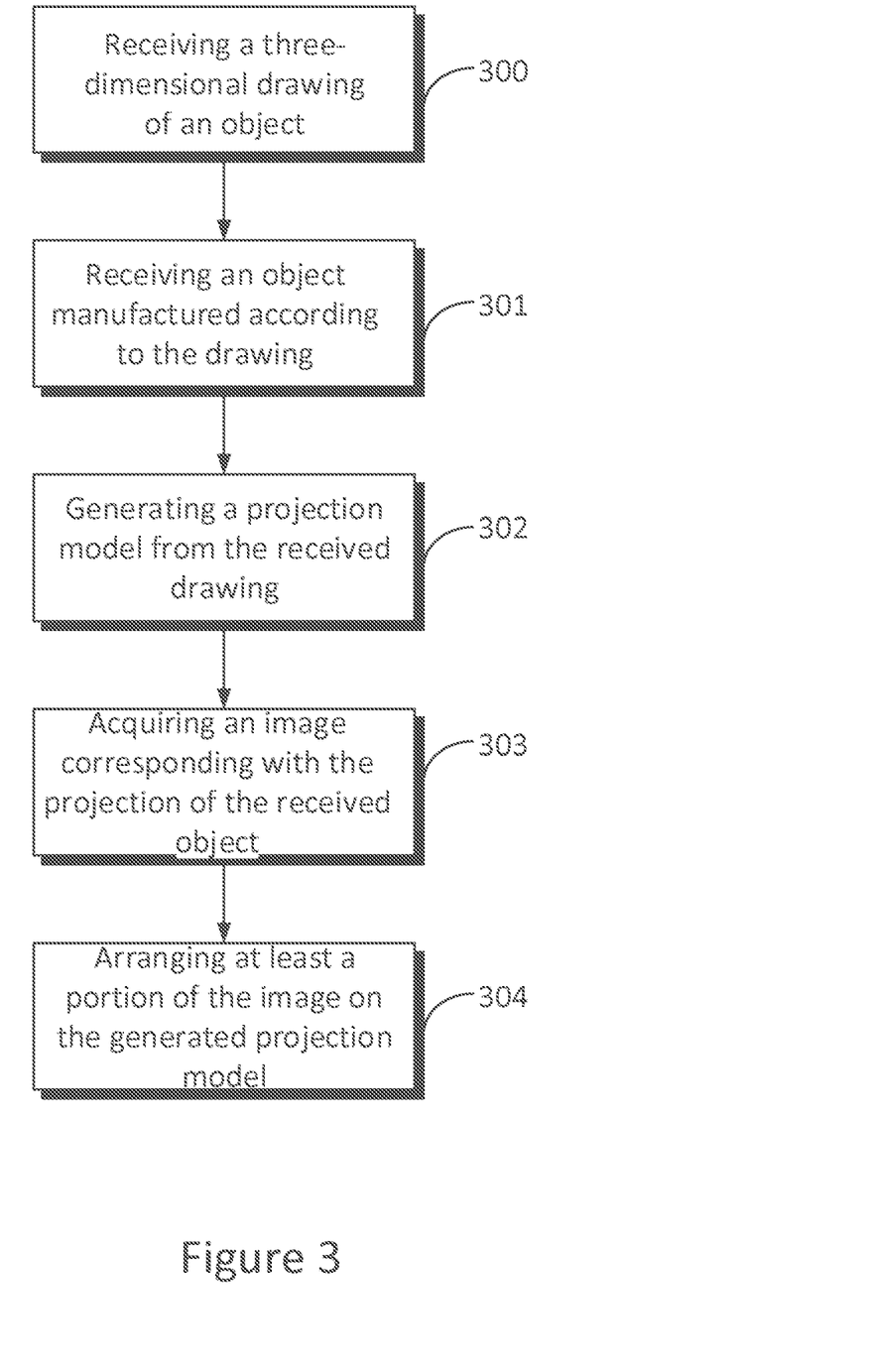
FIG. 3 is an example of a method for generating a computer generated virtual reference object.
Figure 4:
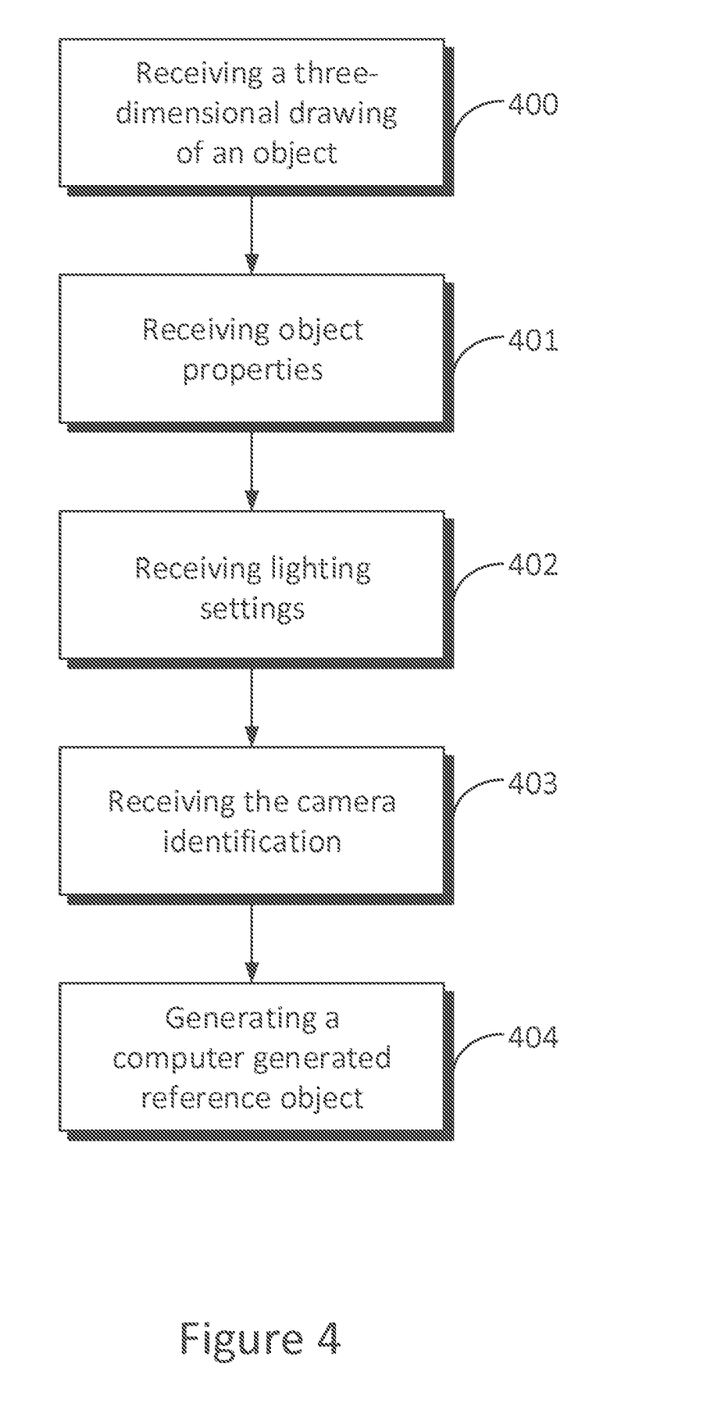
FIG. 4 is an example of a method for generating a computer generated virtual reference object.

The measurement station 102 may be used as it is described in the examples below with referrals to FIGS. 2-4. FIG. 2 discloses an example of a method using a computer generated virtual reference objects. FIGS. 3 and 4 disclose two examples of a method for generating reference views. The benefit of using computer generated virtual reference objects is that the size of the reference is accurately the indented size. This is because no virtual reference object is made and thus, there is no inaccuracies caused by manufacturing tolerances. A person skilled in the art understands that the presented examples are only examples and other similar principles may be used in measurements with a computer generated virtual reference object.

In FIG. 2 an example of a method is disclosed. In the method a measurement station, such as the measurement station of FIG. 1 or similar, may be used. In the measurement first at least one computer generated virtual reference object is received, step 200. The computer generated reference objects are may be received in form of two-dimensional projection views that can be easily compared with images acquired using conventional cameras. However, the model may also be three-dimensional so that two-dimensional projection views are created from the three-dimensional model or the three-dimensional locations of compared discrete features are computed first and then compared with the computer generated reference object. Similar principles may be used also for cameras involving two or more lenses. These cameras are often referred as three-dimensional cameras or stereo cameras. In the method only necessary views of the computer generated virtual reference objects need to be received. For example, when only one feature is measured it may be sufficient to have only one reference. However, typically there is a plurality of reference views corresponding with different camera views and possible object orientations.

The computer generated virtual reference object may be associated with related optional settings which are also received, step 201. For example, if the computer generated virtual reference object involves, for example, a specific lighting setting using a subset of available lighting devices the subset of lights may be active when receiving the optional settings. The computer generated virtual reference object may have been generated using particular lighting devices and it is beneficial to use the same lighting devices when measuring as it will provide better correspondence between compared images.

After the reference views and possible optional settings have been received the measurement station is ready for receiving the first object to be measured, step 202. This may be done by, for example, using a conveyor belt, measurement person, robotic device or any other means for placing the object to a measurement platform of the measurement station.

The object is measured by acquiring a plurality of images, step 203. The images are then compared to respective reference views, step 204. The comparison can be similar to the conventional comparison, wherein the result achieved is the relative differences. However, as the exact measures of the computer generated virtual reference object are known it is also possible to compute absolute measures of the measured object.

In the present application the absolute scale or absolute measures is meant to be an arrangement, wherein the measures can be expressed in exact units, such as, nanometers, millimeters or meters of the metric system.

When measuring the object locations of discrete points on the object are determined and compared with the computer generated virtual reference object. In the present application discrete points means points or features on the object. These include, for example, holes, grooves, edges, corners and similar points that have an exact location on the object and the exact location has been determined by the designer. Conventionally machine vision systems have used point clouds projected on the object. These point clouds are not discrete points on the object as their location is not known with relation to the object and they are not a part of the object.

When the discrete points are derived from the computer generated virtual reference object they are known to be in the ideally correct positions as there cannot be any deviations because of manufacturing tolerances.

In the following two different methods for providing a computer generated virtual reference object are disclosed. However, the following methods should be considered as examples of a method and any other method for generating computer generated virtual reference object may be used.

In FIG. 3 a method for providing a computer generated virtual reference object.

A starting point for generating a computer generated virtual reference object is receiving a model drawing of the object to be measured, step 300. Typically this drawing is a CAD-drawing or other similar computer aided design tool drawing. The object to be measured may be any object that than can be measured using a computer controlled machine vision system. Typically these mechanical parts are used as parts for cars, mobile phones, household devices and any other devices that involve mechanical parts. The model drawing includes coordinates of the object. The coordinates of the drawing may be two-dimensional or three-dimensional. The coordinates exactly define the size of the in a coordinate system which corresponds with the coordinate system used in the measurements.

Then an object that has been manufactured according to the model drawing is received, step 301. The object needs not be so called golden object but an ordinary object with the inaccuracies of the manufacturing process. Thus, it is known that the object is not ideal and has deviations from the ideal measures that are shown in the drawing.

The received drawing of the object is used for producing a projection model, step 302. This projection is typically a two-dimensional view of the object. For generating a projection view the viewing direction and other viewing sensor related parameters must be known. These include, for example, viewing sensor location, rotation angles, focal length, lens errors and other parameters that may be necessary for producing a view corresponding with the camera image. When the identical parameters are for acquiring an image and producing the view the end results are in the same coordinate system and can be compared with each other without any further processing. However, further image processing may be used in some applications.

The process further involves acquiring an image or a plurality of images corresponding with the generated projection mode, step 303. The acquired image comprises the object preferably in conditions corresponding with the actual measuring conditions.

Finally acquired images and projection models are combined so that at least portion of an image is selected and aligned accurately on the projection model. The aligning may be fully automated, however, it is also possible to align the necessary portions manually by hand. In order to be accurate enough acquired images and projection model may be zoomed so that aligning process can be done very accurately. The result of the combination may be used as a computer generated virtual reference object.

In the above the measurement settings are not discussed, however, they may be stored together with the computer generated virtual reference object. Thus, it is possible to use same lighting when measuring as it was used for acquiring images for generating the computer generated virtual reference object.

In FIG. 4 another method for generating a computer generated virtual reference object is disclosed. The method is initiated by receiving a model drawing of the object to be measured, step 400. This is at least partially similar to the step 300 of FIG. 3. The received model drawing may be a set of points indicated by coordinates which are interconnected with each other in order to create an object.

In order to provide the computer generated virtual reference object further object properties are received, step 401. These further properties include, for example, the manufacturing material or materials, the color of the object and similar. Thus, it is possible to determine how the object reflects light and is seen on a camera.

As described above a typical measurement station typically comprises a plurality of independently controllable lighting devices. It is possible that the intensity, wavelength and other properties of the light can also be controlled. In order to generate a computer generated reference model that can be compared with images taken by a camera it is beneficial to know which lighting setting is used. Thus, it is beneficial to receive the lighting setting to be used, step 402.

When generating a computer generated virtual reference object the viewing angle needs to be known. Thus, as with the method of FIG. 3 the information of the camera used for imaging the measured object needs to be known. This may be achieved, for example, by receiving camera identification, which can be used for retrieving the camera location and orientation, step 403.

When the model drawing and the additional properties are known it is possible to generate the computer generated virtual reference object, step 404. The computer generated virtual reference object should be visually as photorealistic as possible. This can be achieved using rendering techniques, such as scanline rendering or raytracing, which are methods for visible surface determination. Raytracing is a technique for generating an image, which may be used as the computer generated virtual reference object, by tracing the path of light through pixels in an image plane and simulating the effects of its encounters with virtual objects. Raytracing is capable of producing very high degree of visual realism and is suitable for the purpose. Raytracing techniques are computationally demanding, however, as the computer generated virtual reference object and the images representing the computer generated virtual reference object may be computed in advance the costly computation may be done in a computing center or similar and needs not to be done by the measurement station. Thus, very high accuracy of the model object may be achieved without a need for increase of computing power when compared with conventional solutions.

In the examples above the cameras and lighting devices may be conventional cameras and lighting devices, however, this needs not to be so. Thus, special cameras and special lighting devices designed for particular wavelengths may be used. Thus, the light does not need to be visible for human eye. Thus, a person skilled in the art understands that the computer generated virtual reference objects are provided as they are seen by the cameras. For example, in some measurements it may be useful to use ultraviolet or infrared wavelengths that are not seen by human eye. The similar principle applies to other viewing sensor types, such as scanners or other measurement devices that produce an image or a measurement that can be compared against computer generated virtual reference object. Thus, the expression image should be understood broadly to cover images generated with various image generation devices that may see the object differently.

In the examples above use of computer generated virtual reference object is disclosed. In the measurements the computer generated virtual reference object is used as it was conventional reference object.

When measuring the three-dimensional discrete point of the computer generated virtual reference object for a k×3 dimensioned matrix V, wherein k represents the number of measurement points. The measured real object has a similar matrix R, however, these matrices are not in the same location or even in the same coordinate-system without positioning. Thus, the difference cannot be calculated directly by calculating R−V. However, as the intention is to achieve absolute scale result in form of matrix R, naturally within the available measurement tolerances, it is sufficient to achieve the R, for example, by using the following, or any other suitable similar, approach.

The problem of positioning may be solved by using conventional positioning methods. One example is conventional 3-2-1 method. Another commonly used option is to use a best fit method. These positioning methods are only examples and also others are available. The methods available may be of different accuracy and this may need to be taken into account when choosing the method.

For providing better understanding one way of computing the coordinates is disclosed in the following paragraphs. Let's assume that coordinates of an individual measurement points or features on acquired two-dimensional images are:

$$V_k = \{x_{1vk}, y_{1vk}, x_{2vk}, y_{2vk} \ldots x_{nvk}, y_{nvk}\}$$

wherein n is the number of cameras and k is the number of measurement points. Thus, it is possible to form a k×2n dimensioned matrix V, wherein k is again the number of measurement points and n is the number of cameras. Correspondingly it is possible to generate a matrix D of same dimensions, wherein each of the rows is of form:

$$\{x_{1dk}, y_{1dk}, x_{2dk}, y_{2dk} \ldots x_{ndk}, y_{ndk}\}$$

wherein n is again the number of cameras and each of the values depict the difference between the real measurement point and virtual measurement point in two-dimensional plane. Correspondingly the coordinates of a measured two-dimensional coordinates are shown on figures in matrix form M=V+D, wherein M is of same dimensions as V and D, and each of the rows are of same form $\{x_{1mk}, y_{1mk}, x_{2mk}, y_{2mk}, \ldots x_{nmk}, y_{nmk}\}$ Absolute scale three-dimensional matrix is R is a k×3 matrix, wherein each row Xk, Yk and Zk are a function of matrix M rows:

$$R_k = \{X_k Y_k Z_k\} = f_k(x_{1mk}, y_{1mk}, x_{2mk}, y_{2mk}, \ldots x_{nmk}, y_{nmk})$$

Thus, $$R = f(M)$$

The above mentioned method may be implemented as computer software comprising computer program code, which is executed in a computing device able to communicate with external devices. When the software is executed in a computing device it is configured to perform the above described inventive method. The software is embodied on a computer readable medium so that it can be provided to the computing device, such as the controller 105 of FIG. 1.

As stated above, the components of the exemplary embodiments can include a computer readable medium or memories for holding instructions programmed according to the teachings of the present inventions and for holding data structures, tables, records, and/or other data described herein. The computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the machine vision system may be implemented in various ways. The machine vision system and its embodiments are thus not limited to the examples described above; instead they may vary within the scope of the claims.

The invention claimed is:

1. A method for measuring an object comprising:
   receiving a three-dimensional computer generated virtual reference object, wherein the received virtual reference object is generated based on a model drawing of the object and the virtual reference object comprises exact coordinates of the object, wherein the exact coordinates comprise coordinates of at least one discrete point;
   acquiring at least two images of the object, wherein the acquired at least two images are acquired with at least two different cameras;
   determining a three-dimensional location of at least one discrete point on the object based on the acquired images, wherein the determined three-dimensional location is in the same coordinate system with the three-dimensional computer generated virtual reference object;
   determining the corresponding discrete point coordinates on the virtual reference object; and
   based on the determined location of at least one discrete point on the acquired images and corresponding exact coordinates on the virtual reference object,
   computing the absolute scale location of at least one discrete point on the object.

2. A method according to claim 1, wherein the method further comprises generating the computer generated virtual reference object based on the model drawing of the object.

3. A method according to claim 2, wherein the generating further comprises receiving additional information comprising at least one of the following: lighting setting information, object material information, object color information or camera parameters.

4. A method according to claim 3, wherein the camera parameters comprise camera coordinates and camera orientation.

5. A method according to claim 2, wherein the generating further comprises:
   acquiring at least one image of a manufactured object;
   generating a projection view based the model drawing, wherein the projection view corresponds with the direction of acquiring at least one image of a manufactured object; and
   aligning at least portion of acquired at least one image on the generated projection view.

6. A method according to claim 2, wherein the generating further comprises producing a photorealistic image of the object based on the model drawing and received additional information.

7. A computer program embodied on a non-transitory computer-readable medium, said computer program comprising one or more instructions which, when executed by a computing device, carry out method according to claim 1.

8. A controller comprising at least one processor and at least one memory, wherein the at least one processor is configured to perform a method according to claim 1.

9. A machine vision system comprising:
   a housing;
   a camera system comprising a plurality of cameras inside the housing;
   a lighting system comprising a plurality of lighting devices inside the housing; and
   a controller, wherein the controller is configured to perform a method according to claim 1.

* * * * *